Oct. 17, 1961 M. O. WILMER 3,004,303
DOORS FOR THE FUSELAGES OF PRESSURIZED AIRCRAFT
Filed June 29, 1959 3 Sheets-Sheet 1
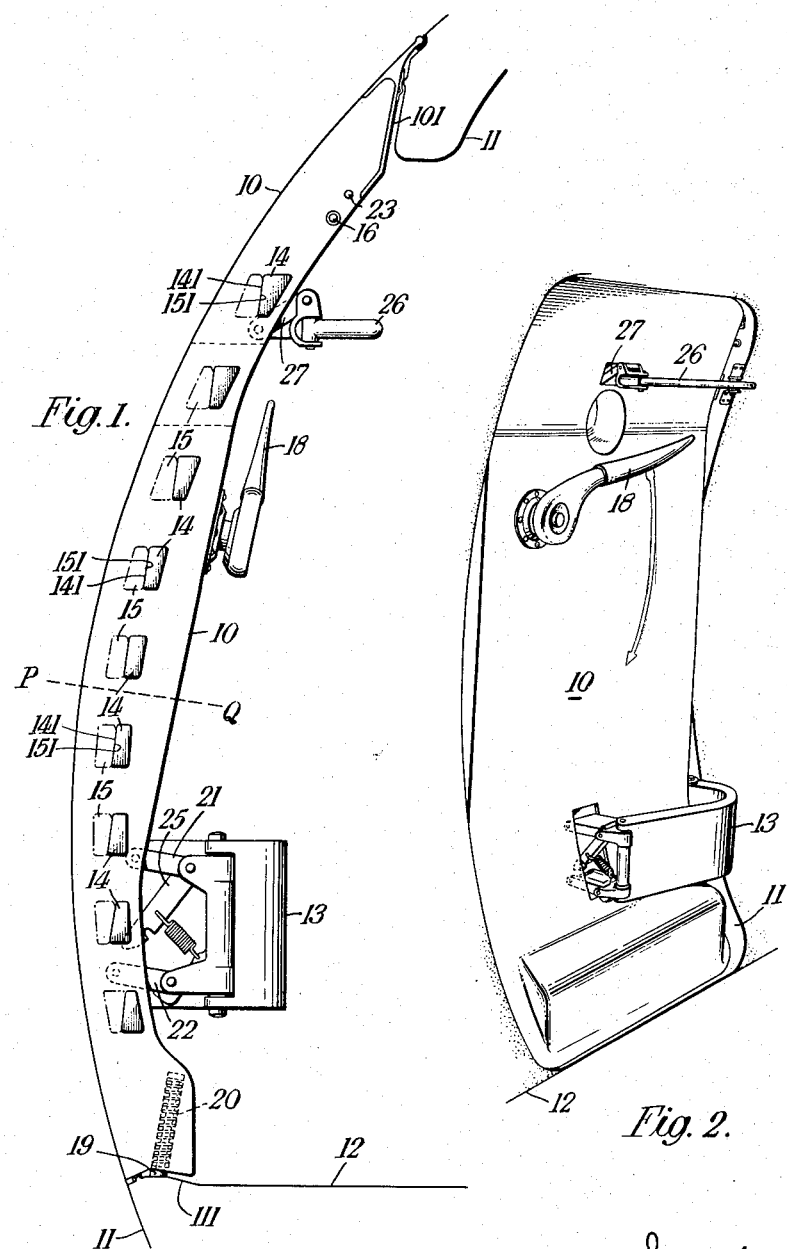

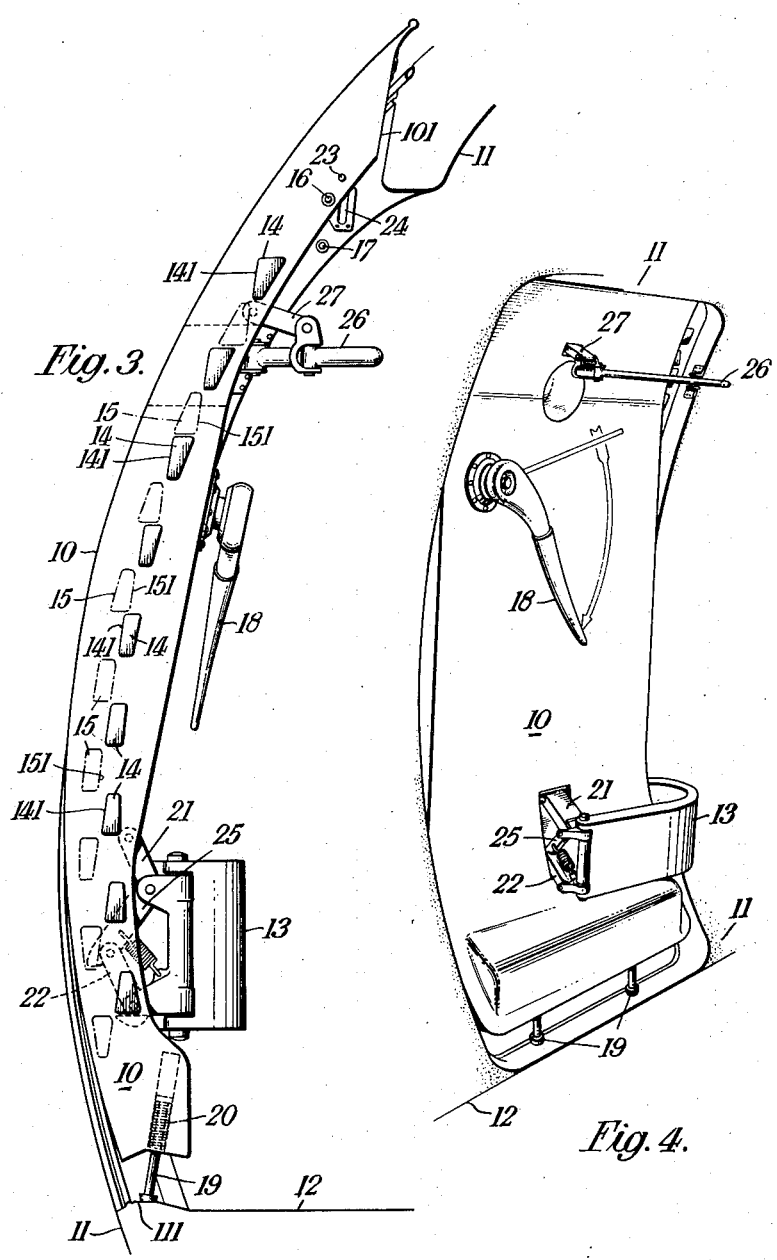

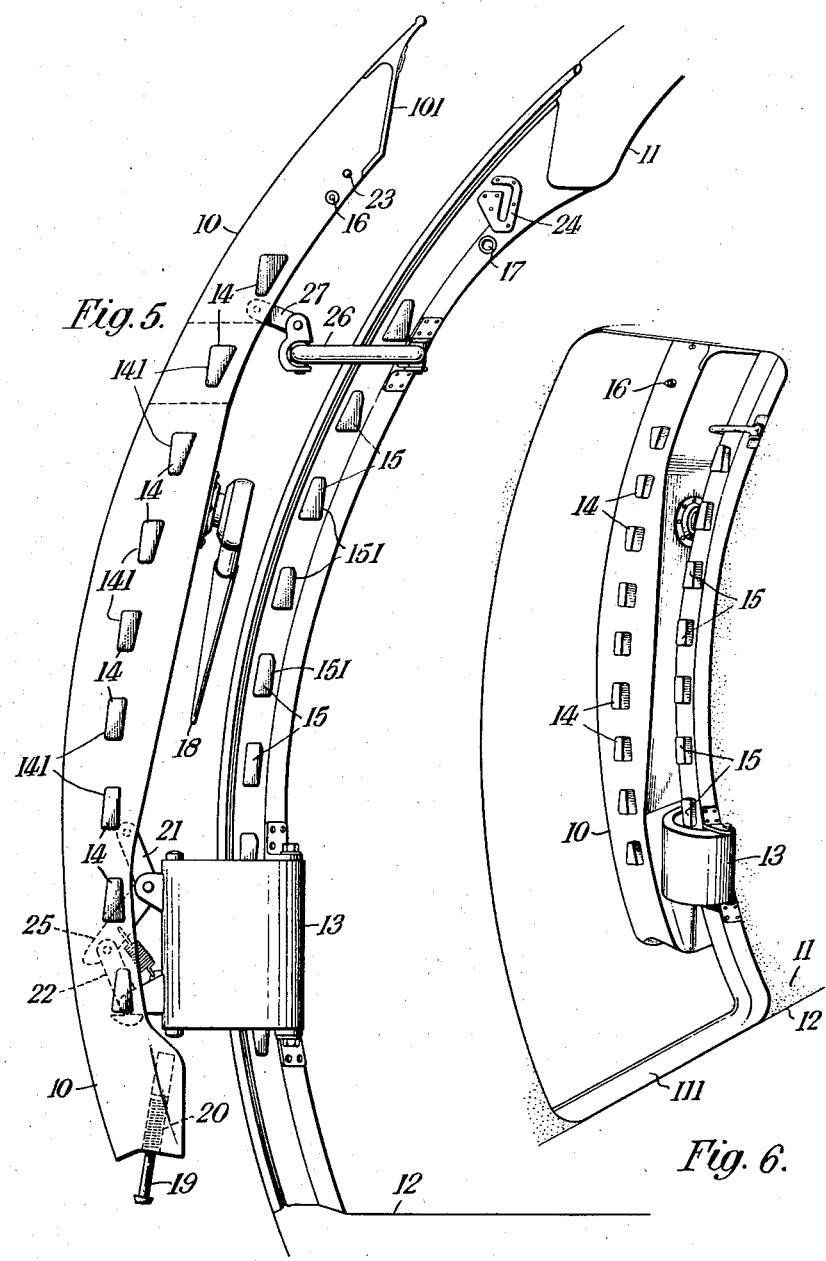

3,004,303
DOORS FOR THE FUSELAGES OF PRESSURIZED AIRCRAFT

Maurice O. Wilmer, Woking, England, assignor to Vickers-Armstrongs (Aircraft) Limited, London, England
Filed June 29, 1959, Ser. No. 823,601
Claims priority, application Great Britain July 4, 1958
6 Claims. (Cl. 20—16)

Among the essential requirements of the door of the fuselage of a pressurized aircraft are (a) That the internal load on the door when closed, due to pressurization, shall be positively and directly resisted by the fixed airframe structure, there being no operating linkage or mechanism under load;

(b) That the door shall be capable of opening outwardly, in order to avoid wastage of cabin space entailed by an arrangement in which the door opens and is stowed internally;

(c) That, in the event of an operator inadvertently failing to latch the door correctly, it will be impossible for the door to take pressure for an initial period and thereafter to become unlatched, e.g. due to vibration, and to blow out with resultant explosive decompression of the cabin and possible fatal consequences thereof.

It is the object of the invention to provide improved means of mounting and securing the door of an aircraft fuselage, by which the foregoing parameters are satisfied, and for this purpose it is proposed by the invention that the door frame and the periphery of the door itself should respectively be provided with sets of spaced laterally extending lugs, arranged so that when the door is closed and the fuselage is pressurized the lugs on the door abut by their outward faces against the inward faces of the lugs on the door frame, said frame lugs positively resisting outward pressure on the door, and means operable from inside the fuselage are also provided whereby, after decompression thereof, the door may be raised with respect to the frame to disengage the abutting faces of the sets of lugs, moving the door lugs to positions intermediate the frame lugs, and permitting the door to be opened.

The said means for raising the door may be operatively connected with the mechanism by which the door is latched and unlatched. Bolts may be provided for projection by said mechanism into sockets when the door is closed, and the arrangements may be such that when said mechanism is reversed to withdraw the bolts, a further movement of the mechanism will cause the door to be raised clear of the frame.

One embodiment of the invention, as applied to the door of a pressurized fuselage is illustrated in and hereinafter described with reference to the accompanying drawings, in which FIG. 1 is a side elevation of the door and FIG. 2 a perspective view thereof, the securing gear being shown in the locked position. FIGS. 3 and 4 are similar views to FIGS. 1 and 2, showing the securing gear in the unlocked position, and FIGS. 5 and 6 are similar views showing the door in the fully open position.

In the drawings the reference numeral 10 denotes the door, 11 the surrounding part of the structure and 12 the cabin floor. The door 10 is mounted upon a main hinge 13 which together with the member 26 is adapted to impart a parallel motion when the door is opened and closed. Said members 13 and 26 lie in different vertical planes, and the arrangement is such that the member 26 prevents the door from rotating about the pivot of the main hinge 13, thereby ensuring the desired parallel motion.

A number of spaced lugs 14, having outward faces 141 disposed at an angle of substantially 90° to the mean line of pressure acting on the door 10 when the fuselage is pressurized, are machined out of the marginal structure of the door along each substantially vertical side thereof. Similar spaced lugs 15 are machined out of the door frame, so that they present to the outward faces 141 of the lugs 14 on the door, when the latter is closed, corresponding inward faces 151 against which the door lugs 14 abut when the fuselage is pressurized; thus, the door is positively retained and the entire load on the door is resisted directly by the door frame lugs 15. The door cannot move downwards because of the sill 111 and cannot move upwards when under pressure, due to the friction between the mating faces of the door lugs 14 and frame lugs 15. When the door is correctly latched, spigots or bolts 16 from the door will engage in holes 17 in the surround frame, thus locking the door firmly, but in case such spigots or bolts 16 should not be home, the friction between the lug faces 141, 151 is more than adequate to prevent upward movement of the door, and under pressure the door is absolutely safe. A conventional pressure seal (not shown) will surround the door to prevent leakage.

The fact that the plane of the contact faces 141, 151 of the mating lugs 14, 15 is normal to the mean line of pressure acting on the door (indicated in FIG. 1 by the line PQ) ensures that there will be no vertical component of the pressure loads tending to lift the door. In order to open the door, the operating handle 18 is moved in a downward direction which causes the extension of a pair of actuating feet 19, 19 from the underside of the door, the handle 18 and feet 19 being connected by operating mechanism housed within the door. These contact the door sill 111 and consequently lift the door. The operation may be assisted by the provision of springs 20 such that a proportion of the door weight is counterbalanced, only a very light operating load on the handle 18 being needed.

The vertical plane of travel of the door is angularly inclined away from the mating plane of the lugs 14, 15 so that they move apart and do not slide against one another. Similarly, the top edge of the door is angled as shown at 101, such that it does not slide against the fuselage but moves away.

To enable the door to be lifted, a small vertical parallel linkage 21, 22 is inserted between the main hinge arm 13 and the door. The door is guided upwards by a spigot 23 sliding in a guide plate 24 (see FIGS. 3 and 5) on the door surrounds. A horizontal displacement of the vertical linkage is taken up by the free swinging of the main hinge arms. The vertical parallel links at the main hinge arm have a spring-loaded slip latch 25 attached such that when the door has travelled through its vertical displacement, the latch 25 engages the pivot of the link 22 (FIGS. 3 and 5) so that the weight of the door weight is supported by the main hinge arm 13. The door lugs 14 are then free to pass between the retaining lugs 15 on the door-frame 11, and the door can be opened. When closing the door, it can be lightly pulled in, so that the lugs 14 thereon pass between the retaining lugs 15, when the door is ready to be lowered into the safe position. The member 26 is connected to the door through a vertically swivelling link 27.

With the door brought in and ready to lock, an initial upward movement of the operating handle 18 disengages the latch 25 so that the door, controlled by the guide plate 24, is free to drop safely behind the surround retaining lugs 15. Considerable tolerance between the surround lugs 15 and door lugs 14, which will be taken up by lateral movement of the door under pressure, allows completely free fall of the door. Full movement of the handle 18 will then re-locate the locking spigots or bolts 16 and the door is safely locked and sealed.

In the event of improper operation of the door by the careless operator, either, (a) The door latch 25 will not have been released and therefore the door is free to float and cannot react any pressure loads whatsoever, or, (b) Initial movement of the handle 18 will have triggered the latch support and the door fall freely.

In the event of there being no obstruction on the floor sill 111 the door will automatically drop to its fully closed position. The fact that the operator may not have ensured that the locking spigots or bolts 16 have gone home is immaterial, because the friction forces between the mating lugs 14, 15 are sufficient to ensure the positive retention of the door in the down position against all manual and inertial loads. In the event of the door being prevented from dropping to the fully closed position by a pebble or other obstruction resting on the sill 111, danger cannot arise because, however small the overlap of the mating lugs 14, 15, the strength of the engagement will be adequate to retain the door and the friction forces will be of the same magnitude as in the full engagement. On the other hand, the existence of a large gap under the door will prevent the pressurization of the cabin. In the event of the door falling through most of its travel before stopping against, say, a small pebble, although the gap may be sufficiently small for a considerable degree of pressurization to take place, the overlap of mating lugs 14, 15 will be adequate for full retention and again adequate frictional locking. Hence, in the extreme case of the door being released but not locked, in addition to the door being structurally safe, there will be—

(a) The usual red warning lights indicating that the door is not locked.

(b) The noise of cabin air leakage through the gap under the door will establish that it is not fully down.

(c) The inability of the pressurization equipment to adequately maintain cabin altitude will be apparent to the flight engineer.

(d) Visual inspection of the door and locking spigots or bolts will show the incorrect position of the door.

Appropriate action can then be taken by the crew with knowledge that in the meantime the door is quite safe.

In the event of an emergency landing and the consequent necessity for a speedy evacuation of the cabin, when the doors may have to be opened by the passengers in panic conditions, it is important that (a) the doors should not open inwardly in opposition to the passengers trying to get out, (b) that the operating handles 18 would themselves provide a clear indication of the correct mode of operation, and (c) that the immediate operation of a handle should not be impeded by catches or slip latches. The door provided by this invention does not move inwards in any way when unlatching, prior to opening, and has a large handle placed high on the door such that it clearly can only move downwards. No auxiliary slip latch is necessary as the weight of the door holds the locking pins home. Any movement of the handle produces a corresponding vertical travel of the door, thus encouraging the unfamiliar operator to continue the movement until the lugs disengage.

In the event of the aircraft lying on its back, the spring-loaded feet, together with the weight of the door, assist the door to fall to its free position, and if the impact inertia of the door has automatically withdrawn the locking pins, a small movement of the handle is all that is needed to withdraw the pins, allowing the door to fall freely to disengage and open.

What I claim as my invention and desire to secure by Letters Patent is:

1. In the fuselage or body of a pressurized aircraft, the combination of a door and a door frame each of which is provided about its periphery with a set of spaced laterally extending lugs, the arrangement being such that when the door is closed and the fuselage is pressurized the lugs on the door abut by their outward faces against the inward faces of the lugs on the door frame, said frame lugs being disposed relatively to said door lugs when the door is closed to positively resist outward pressure on the door, and comprising means operable from within the fuselage whereby, after decompression thereof, the door can be raised with respect to the frame to disengage the abutting faces of the opposed lugs, the door lugs being moved to positions intermediate the frame lugs, permitting the door to be opened, said door-raising means comprising feet slidably mounted in the base of the door and a handle connected to said feet for projecting the same downwardly to bear against the sill of the frame, and, by downward pressure thereagainst by continued movement of the handle, to raise the door into the position in which the sets of lugs are disengaged.

2. The combination claimed in claim 1, including spring means for assisting the operation of the door-raising handle by partially counter-balancing the weight of the door.

3. The combination claimed in claim 1 wherein the upward movement of the door is guided in a direction inclined away from the mating planes of the lugs the top edge of the door being suitably angled so that when raised it moves out of contact with the frame.

4. The combination claimed in claim 1 wherein the door is mounted upon arms hingedly connected to the frame and wherein, to permit relative upward movement between the door and the frame, the hinge arm incorporates a vertical parallel linkage.

5. The combination claimed in claim 4, wherein the vertical movement of the door in the frame is guided by the cooperation of a spigot on the door sliding in slotted guide plates affixed to the frame.

6. The combination claimed in claim 4, including means whereby, when the door has reached its maximum vertical displacement relative to the door frame, the parallel linkage is locked so that the weight of the door is supported by the hinge arm.

References Cited in the file of this patent

UNITED STATES PATENTS

| | | |
|---|---|---|
| 478,748 | Grosh | July 12, 1892 |
| 1,202,068 | Juruick | Oct. 24, 1916 |
| 1,775,681 | Marino | Sept. 16, 1930 |
| 2,195,991 | Lovett | Apr. 2, 1940 |
| 2,751,636 | Heinemann et al. | July 26, 1956 |
| 2,780,384 | Stratton et al. | Feb. 5, 1957 |

FOREIGN PATENTS

| | | |
|---|---|---|
| 364,749 | Great Britain | Jan. 14, 1932 |